(12) United States Patent
Foley

(10) Patent No.: US 11,424,780 B2
(45) Date of Patent: Aug. 23, 2022

(54) WEARABLE HEAD UTILITY SYSTEM

(71) Applicant: Thales Holdings UK Plc, Reading (GB)

(72) Inventor: John Foley, Reading (GB)

(73) Assignee: THALES HOLDINGS UK PLC, Reading (GB)

( * ) Notice: Subject to any disclaimer, the term of this patent is extended or adjusted under 35 U.S.C. 154(b) by 320 days.

(21) Appl. No.: 16/624,720

(22) PCT Filed: Jun. 22, 2018

(86) PCT No.: PCT/GB2018/051759
§ 371 (c)(1),
(2) Date: Dec. 19, 2019

(87) PCT Pub. No.: WO2019/002830
PCT Pub. Date: Jan. 3, 2019

(65) Prior Publication Data
US 2021/0159931 A1   May 27, 2021

(30) Foreign Application Priority Data
Jun. 26, 2017 (GB) .................. 1710184

(51) Int. Cl.
*H04R 1/10* (2006.01)
*H04B 1/3827* (2015.01)
(Continued)

(52) U.S. Cl.
CPC .......... *H04B 1/385* (2013.01); *A42B 3/0406* (2013.01); *A42B 3/30* (2013.01); *H04R 1/1041* (2013.01); *H04R 5/033* (2013.01)

(58) Field of Classification Search
CPC ......... H04B 1/385; A42B 3/0406; A42B 3/30; H04R 1/1041; H04R 5/033
(Continued)

(56) References Cited

U.S. PATENT DOCUMENTS 6,461,054 B1 * 10/2002 Iwase ................... G02B 6/3849
   385/70
2002/0159715 A1 * 10/2002 Kimura ................. G02B 6/389
   385/75

(Continued)

FOREIGN PATENT DOCUMENTS

WO   WO 2010/074791   7/2010
WO   WO 2013/063165   5/2013

OTHER PUBLICATIONS

Combined Search and Examination Report for GB 1710184.1 dated Nov. 14, 2017, 3 pages.
(Continued)

*Primary Examiner* — Ammar T Hamid
(74) *Attorney, Agent, or Firm* — Dority & Manning, P.A.

(57) ABSTRACT

A head utility system (20) comprising: a headset (22) comprising: a first power or data connector (28) for connecting to an off-headset power or data system (30); and a second power or data connector (38); the head utility system further comprising: headwear (24) for wearing over the headset, the headwear comprising: a headwear power or data connector (44) for connecting to the second power or data connector; wherein the second connector and the headwear connector are arranged to be releasably connected when the headwear is worn over the headset, such that power or data can be transferred between the headset and the headwear.

14 Claims, 6 Drawing Sheets

(51) Int. Cl.
*A42B 3/30* (2006.01)
*H04R 5/033* (2006.01)
*A42B 3/04* (2006.01)
*H04R 5/02* (2006.01)

(58) Field of Classification Search
USPC .................................................. 381/74, 301
See application file for complete search history.

(56) References Cited

U.S. PATENT DOCUMENTS

| 2009/0126059 | A1  | 5/2009 | Tack et al. |
| 2011/0197327 | A1* | 8/2011 | McElroy ................. A42B 3/32 |
|              |     |        | 2/2.5 |
| 2017/0052000 | A1  | 2/2017 | White et al. |
| 2020/0060573 | A1* | 2/2020 | Cohen ................. A61B 5/4064 |

OTHER PUBLICATIONS

International Search Report for PCT/GB2018/051759 dated Aug. 20, 2018, 2 pages.
International Preliminary Report on Patentability for PCT/GB2018/051759, dated Jan. 9, 2020, 8 pages.

* cited by examiner

WEARABLE HEAD UTILITY SYSTEM

PRIORITY CLAIM

This application is based upon and claims the right of priority under 35 U.S.C. § 371 to International Application No. PCT/GB2018/051759 filed on Jun. 22, 2018, which claims priority to GB 1710184.1 filed on Jun. 26, 2017, each of which is incorporated by reference herein in its entirety.

FIELD

Embodiments described herein relate to a wearable head utility system, in particular, a power and data system.

BACKGROUND

In many fields, in particular in the armed services, wearable electronics are becoming increasingly prevalent. Typically, such wearable systems are moving towards a centralised power and data architecture, with a central power and/or data system located on a user's torso and various physically separated sub-systems. The central power and/or data system needs to exchange power and/or data with electronic modules (e.g. cameras, microphones, vision systems . . . ) located around a user's body. Commonly, such electronic modules—forming a remote sub-system—are located on a user's head. Increasingly, these electronic modules are located on a user's headwear—typically a helmet.

Connecting helmet-based electronic modules to a central power and/or data system located on the user's torso can be done by running cables from the user's torso to the remote electronic modules. This arrangement poses a number of problems when considering head-based modules. For example, the cables pose snag issues and greatly complicate the removal of the headwear. It may be necessary to disconnect and reconnect the electronic modules every time a user wants to remove the headwear. This is unacceptable in certain circumstances.

It may be possible to directly connect the power and/or data system on the torso to the electronic modules located on the head using "wireless links" such as radio, optical, magnetic or inductive devices. Such an arrangement may remove the necessity of running cables to the head, but will typically result in an easily detectable signature, allowing a third party to detect the presence of the user. In a battlefield environment, this may be used as a trigger for improvised explosive devices. There is also a risk that certain wireless links would cause electromagnetic conduction issues with other nearby electronic equipment.

Wireless links with a very limited range may be used to connect the power and/or data system on the torso to the electronic modules located on the head without causing a signature which can be detected by third parties. Unfortunately, given the restriction on the range of such systems, they generally require precise alignment and thus are not suitable for practical scenarios where a user is constantly tilting or twisting their head relative to their body, since this will result in an unreliable and intermittent connection.

SUMMARY OF INVENTION

In the present disclosure it has been realised that an advantageous arrangement is provided in which a head utility system comprises two parts—a headset with a connector arranged to be connected to an off-headset power and data system, and headwear which can be worn over the headset and be connected to the headset by a pair of connectors.

According to an embodiment is a head utility system comprising:
a headset comprising:
a first power or data connector for connecting to an off-headset power or data system; and
a second power or data connector;
the head utility system further comprising:
headwear for wearing over the headset, the headwear comprising:
a headwear power or data connector for connecting to the second power or data connector;
wherein the second connector and the headwear connector are arranged to be releasably connectable or connected when the headwear is worn over the headset, such that power or data can be transferred between the headset and the headwear.

The head utility system may be a head-worn utility system.

The headset may comprise a support frame for locating the headset on a wearer's head.

The headset may comprise a power or data system. The headset power or data system may comprise the first power or data connector and the second power or data connector.

A head utility system allows the use of electronic modules which require power or data on the head of a user. Although the present disclosure is in no way limited to such an arrangement, it is envisaged that the head utility system may connect to a torso-based power supply or data storage unit and thus facilitate the communication or transfer of power between the torso-based system and head-based electronic modules.

The head utility system of the present disclosure is described as operating with power or data. It is important to note that the present disclosure equally relates to a power and data system. As such, the term "power or data" can be replaced, mutatis mutandis, with "power", "data" or "power and data" anywhere herein.

The head utility system comprises a two part system: a headset for locating on a wearer's head and headwear for wearing over the headset. A power or data connection may be provided between the headset and headwear by the connection of the second power or data connector (second connector) on the headset and the headwear power or data connector (headwear connector). Electronic modules on both the headset and the headwear can therefore be connected to a (for example) torso-based power or data system.

The head utility system provides an advantageous arrangement which facilitates easy removal of the headwear without the risk of snagging cables on surrounding items or without the need to completely disconnect and reconnect the entire head utility system. During use, a wearer may put the headset on their head and connect the headset, using the first power or data connector (first connector), to a torso-based power or data system, thus providing power or data to the headset (for example to the headset power or data system). The user can then put headwear—for example a helmet—over the top of the headset. The headwear connector connects with the headset's second connector and thus power or data is provided to the headwear (for example to a headwear power or data system). Since the headwear is connected to the headset, rather than the torso, there is no risk of snagging wires. The user can remove the headwear very simply from the headset when the headwear is no longer needed or may be cumbersome.

Typically a headset is much smaller, more light weight and more comfortable than the headwear. Accordingly, a user is unlikely to remove the headset, especially if it is also functioning as an audio headset and is providing radio communication. Users will typically want to retain their audio headsets in place on their heads even when they remove their helmets so that they can maintain their radio communications. If the first connector of the headset is a wired link to a—for example—torso power or data system, there is little burden related to snag issues for the headset since a) the cable can conveniently be located, for example down the back of a user's neck and b) the headset is rarely removed.

The terminology "wearing the headwear over the headset" may describe an arrangement in which a part of an item of headwear is located on top of a part of the headset with respect to a user's head. That is, at least part of the headset may be located between a part of the headwear and a user's head. The headwear will be put over the top of the headset, i.e. after the headset has already been put on. As such, putting a helmet over an audio headset falls within the scope of this phrase, as does putting a pair of glass or goggles over an audio headset, since at least a portion of the arms or frame of the goggles/glasses will overlap a portion of the audio headset.

Given that the headwear is worn over the top of the headset, the headset and headwear will be in very close proximity. This makes it easy for the headset's second connector and the headwear connector to physically engage, or wirelessly connect. This provides a great deal of freedom when selecting the type of connection to be provided between the headset and headwear and provides advantages when using certain types of connection. The second connector and the headwear connector are arranged to releasably connect; they may therefore be releasable connectors. The first connector may also be a releasable connector.

Where it is said that the second connector and the headwear connector "connect", it is to be understood that this can refer to a physical connection, or a wireless connection—i.e. a connection in the sense that power and/or data can be communicated between the second connector and the headwear connector.

Since both the headset and headwear are located on a user's head, there will be little or no relative movement between the headset and the headwear. This also provides advantages.

The close proximity and lack of relative movement means that a wired connection between the second connector and headwear connector is possible. The second connector and headwear connector (which provide the wired connection) may be configured to automatically mate when the headwear is fitted onto a user's head, over the headset. Any safety aspects relating to the "open" power connections (e.g. short circuit threats) could be mitigated by managing the power lines from the wireless data links or from the use of a proximity switch—for example, power may only be present at the contacts of the connectors after a full data link is implemented, or when the headset and headwear are within a certain distance of each other.

The close proximity and lack of relative movement also means that a short range wireless connection may be used. The second connector and the headwear connector may utilise a short range wireless connection. Unlike with a head-torso link, the headset-headwear link will span a much shorter distance and will be kept in an aligned arrangement, since there will be little or no relative movement between the headset and headwear. This also means that an optical link between the second connector and headwear connector is possible. This optical link may be made using, for example, free-space optical connectors.

A further advantage provided by the present arrangement is that it is easier to suppress a signature from certain short range wireless links, such as optical connections, by locating the connection (i.e. second connector and headwear connector) inside the headwear such that any light spill from the connection is blocked/reflected absorbed by one of the user's head, the headset and the headwear.

The headset may comprise a support frame. The support frame may be configured to support the headset on a user's head such. Accordingly the support frame may be made out of a flexible material, for example webbing. The support frame may comprise a series of straps and form a harness. The support frame may comprise a band for encircling a user's head and/or a strap arranged to extend across the top of a user's head. The support frame may be arranged such that a second connector can be located on top of a user's head, when the headset is worn.

The support frame may comprise a closure mechanism, for example a buckle, Velcro™, a clip, clasp, button or zip arranged to secure the support frame—and hence headset—to a user's head.

The first connector and/or the second connector may be arranged on the support frame. They may be attached to, or integral with the support frame. The first and/or second connector may be releasably connected to the support frame.

The headset may comprise a headset power or data system. The headset power or data system may comprise power or data cables. The first connector and second connector may be connected by the power or data system. The power or data cables may connect the first connector and the second connector. The headset power or data system may connect an electronic module to the first connector and/or the second connector. The headset power or data system may provide a network to which power or data devices can be attached. The headset power or data system may comprise a power or data device, e.g. an electronic module. Cables may be integral with the support frame or members of the support frame.

References herein to a power or data system may refer to a power or data circuit, and/or a collection of power or data devices or modules which may, or may not, be interconnected.

The headset may comprise an electronic module connected to the headset power or data system.

The electronic module may receive power or data from the headset power or data system. This power or data may originate from an off-head power or data system (e.g. a torso power or data system). The electronic module may be integral with the headset power or data system. The electronic module may be arranged on, or connected to, the support frame.

Examples of electronic modules include a camera, a screen, a microphone, a speaker, an earpiece, vision aiding equipment (e.g. night vision goggles, etc. . . . ), a processor, a data storage unit, a thermometer, a fan, a sensor (e.g. light level sensor, radiation detector, . . . ) or any other electronic equipment suitable for use with a head utility system according to the present disclosure.

The headset power or data system may comprise a port for providing power or data to an electronic module. The port may allow an electronic module to be attached and disconnected from the headset. The port may be a universal port, allowing a plurality of different electronic modules to be connected and disconnected from the headset.

The port may comprise a mechanical attachment device for attaching and detaching the electronic module. The port may comprise a fastener. The fastener may be for supporting the weight of the electronic module so that the port may both mechanically and electronically connect the electronic module to the headset power or data system and thus the headset. The mechanical attachment device may be a universal fastener, allowing a plurality of different electronic modules to be connected and disconnected from the headset.

The headset may be an audio headset and may comprise at least one of an earpiece (or speaker) and a microphone. An earpiece and/or a microphone may be referred to herein as audio elements. The headset power or data system may comprise at least one of an earpiece (or speaker) and a microphone.

The headset may be an audio headset comprising a speaker (which may be, for example, an earpiece or headphone speaker) and a microphone. The headset may be of the type typically worn by soldiers under their helmets. The support frame may comprise a series of material straps which secure the headset to a wearer's head, with a microphone and earpiece or headphones connected to the headset power or data system. The headset power or data system (and hence the microphone and earpiece) may be connected, via the first connector, to a torso-mounted power or data system comprising a power supply and/or data storage.

As described above, the first connector may be for connecting to a power or data system located away from the wearer's head. This may, for example, be a torso-worn power or data system. This allows the head utility system to connect to a power supply or data storage/processor meaning that one does not need to be a part of the head utility system. However, in alternative embodiments, the head utility system may comprise a power supply and/or a data storage unit and/or a processor and the first connector may be construed to be the connection to these features.

The first connector may comprise a first releasable power or data connector. The first connector may comprise a cable, connected or connectable to an off-head power or data system.

The first connector may comprise a female connector, for example for receiving a male power or data connector (e.g. a power socket or data socket for receiving a plug or data cable connector).

The first connector may comprise a male connector, for example for being inserted into a female power or data connector (e.g. a power plug or data cable connector for inserting into a power or data socket).

The first connector may comprise a single coupling (connector) for transferring power or data. The first connector may comprise a single coupling (connector) for transferring power and data. The first connector may comprise multiple couplings (connectors); for example, the first connector may comprise a first coupling for transferring power and a second coupling for transferring data. Where it is stated herein that a connector may comprise a specific connector type—for example a free-space optical connector—it is to be understood that the free-space optical connector may be one of the couplings (for example for transferring data), and that a further coupling (e.g. a standard 12V connector for transferring power) may also be part of the connector. Where a connector comprises two couplings, the two couplings may be co-located, or located at different locations.

The first connector may comprise a power connector for transferring power between the headset and the headwear. The first connector may comprise a data connector. The first connector may comprise a male or female connector. The first connector may comprise electrical contacts. The first connector may comprise an inductive power transfer connector. The first connector may comprise a 12V power connector. The first connector may comprise a wired connector. The first connector may comprise a mechanical connector. Examples may include: DC or AC power plugs or sockets, USB connectors, RJ45 connectors, RJ12 connectors, RJ11 connectors, secure data connectors, Ethernet connectors, free-space optical connectors and fibre optic connectors. The first connector may comprise a wireless type connector. For example, the first connector may utilise NFC, Bluetooth™, magnetic induction, short range Ultra Wide Band, WiFi or optical methods (such as free-space optical connectors) to provide wireless communication with an external power or data system. As such, the first connector may comprise a wireless connecter, suitable for use with the listed, and any other known wireless technology.

The headset may be an audio headset and the first connector may be connected to one of the audio elements (e.g. an earpiece or speaker) of the audio headset.

The first connector may be arranged such that it is located in the occipital region of a user's head when the headset is worn. The first connector may be connected to a part of the support frame which is arranged such that it is at the back or towards the rear of a user's head when the headset is worn. This allows the cable of the first connector (if the first connector is a wired connector) to be located down the back of a user's neck, which is a convenient location.

The headwear may be a helmet. The helmet may be a helmet which would be worn by a soldier in a battleground. The helmet may be a helmet which would be worn by a construction worker on a construction site. The headwear connector may be located inside the helmet. The second connector may be located such that it is inside the helmet when the helmet is worn over the headset.

The headwear may be any item of headwear which may be associated with an electronic module requiring power or data. Further examples of possible headwear include glasses, goggles (and other vision systems) and hats.

The headwear may comprise a power or data system. Discussion relating to the headset power or data system applies to the headwear power or data system, mutatis mutandis. The headwear power or data system may comprise the headwear connector.

The headwear power or data system may be connected to, or integral with, the headwear. The headwear power or data system may be arranged on the inside of, the outside of, or in the surface of the headwear.

If the headwear is a helmet, the power or data system may be arranged on the inside, the outside or within the structure of, the helmet. If the headwear is a set of goggles or glasses, the power or data system may be attached to the arms or the frame of the glasses or goggles. The headwear connector may also be located on the arms or the frame of the glasses or goggles. The second connector and headwear connector may be configured such that the arms or frame of the glasses/goggles snap fit into the underlying headset, providing the connection between the headset and headwear.

If the headwear is a pair of glasses or goggles, the glasses/goggles may comprise a module in the form of a sensor.

The glasses/goggles may be configured to project information onto a lens of the glasses/goggles.

The headwear power or data system may comprise a power storage unit. The headwear power storage unit may comprise a battery. The headwear power storage unit may be for powering an/the electronic module(s).

The headwear power storage unit may be physically located on, and attached to, the headwear.

The headwear power storage unit may be for use where the second connector and headwear connector are data connectors. Alternatively, the headwear power storage unit may be for use when a power connection between the second connector and headwear connector cannot be made, or for topping up the power supplied through the connection between the second connector and headwear connector.

The headwear power or data system and power storage unit may be connected to the headwear connector such that the power storage unit can be charged with power supplied through the headwear connector.

The headwear power or data system may comprise a port for providing power or data to an electronic module.

The headwear, or headwear power or data system, may comprise an electronic module. The electronic module may be connected to the headwear power or data system.

The discussion above, relating to the port and electronic module made in relation to the headset applies, mutatis mutandis, to the port and electronic module discussed in relation to the headwear.

The headset or headwear may comprise a mechanical attachment device for attaching and detaching an electronic module.

The headset or headwear may comprise a plurality of ports and/or mechanical attachment devices, for example 2, 3, 4, 6, 8 or more than 8.

The second connector and the headwear connector are arranged to be releasably connected when the headwear is worn over the headset. In order to be arranged as such, the second connector and headwear connector may be located on the headset and headwear respectively, such that when the headset and headwear are worn on a user's head, the second connector and headwear connector are aligned and brought close enough to each other to connect. As such, the second connector and headwear connector being arranged to releasably connect when the headwear is worn over the headset means the two connectors are positioned such that they can connect when the headwear is worn over the headset in a normal manner and can disconnect when the headwear is taken off from over the headset.

The second connector may be arranged on the headset at a location corresponding to that of the headwear connector on the headwear, such that when the headwear is put on over the headset, the second connector and headwear connector are aligned or co-located and can connect.

The second connector and the headwear connector may be arranged such that they automatically connect when a user puts the headwear on over the headset. The second connector and headwear connector may be arranged such that they automatically disconnect when the user removes the headwear from over the headset.

The second connector and the headwear connector may automatically connect and disconnect, i.e. if no human intervention is required to connect or disconnect the connectors, other than that involved with putting the headwear on and taking the headwear off.

As such, in order to automatically connect, the act of putting the headwear on a user's head over the headset may be sufficient to move the second connector and headwear connector into alignment and to move them into a connected arrangement. What is meant by a connected arrangement will depend on the type of connector; some connectors will require physical contact, while others will be able to connect wirelessly and thus will not require a physical contact, only proximity and/or alignment. As such, the use of the phrase "connected" does not necessarily imply physical contact of the connectors. In order to automatically disconnect, the act of removing the headwear from over the headset may be sufficient to remove the connectors from a connected arrangement (e.g. without any further intervention from a user).

The second connector and the headwear connector may comprise, or be, "wired" connectors (i.e. requiring a physical contact to transmit power or data between the headset and the headwear). When the second connector and headwear connector require physical contact to connect (e.g. a "wired" connection), the second connector and/or headwear connector may comprise self-aligning magnetic connectors, arranged to automatically connect when a user puts the headwear on over the headset. Examples of such a connector may include commercially available connectors such as the AB mag-Net™ from TT Electronics™.

The second connector and the headwear connector may be arranged (for example on the support frame and headwear) such that they are located at the top portion of a user's head when the headset is worn. The second connector and headwear connector may be arranged such that they are located over the parietal region of a user's head when the headset is worn. The second connector and the headwear connector may be arranged such that they are located over the frontal region of a user's head when the headset is worn.

The head utility system may comprise a guide arranged to help locate the headwear connector relative to the second connector such that they connect when a user puts the headwear on over the headset. The headwear, headset or both of the headwear and headset may comprise such a guide. The support frame of the headset may comprise such a guide. Alternatively, the guide may be part of the second connector or headwear connector. The guide may facilitate the automatic connection of the second connector and the headwear connector.

The guide may help locate the second connector and/or headwear connector such that it is in a position to connect to the other connector. The guide may align the second connector and the headwear connector as the headwear is put on over the headset.

The guide may comprise a protrusion, series of protrusions, ridge or wall. The guide may form a channel or funnel in order to capture and guide one or both of the connectors into alignment.

One of the second connector and the headwear connector may comprise a male connector and the other of the second connector and the headwear connector may comprise a female connector.

The second connector—headwear connector connection may transfer power, or data, or power and data.

The second connector and headwear connector may each comprise a single coupling (connector) for transferring power or data. The second connector and headwear connector may each comprise a single coupling (connector) for transferring power and data. The second connector and headwear connector may each comprise multiple couplings (connectors); for example, each of the second connector and headwear connector may comprise a first coupling for transferring power and a second coupling for transferring data. Where it is stated herein that a connector may comprise a specific connector type—for example a free-space optical connector—it is to be understood that the free-space optical connector may be one of the couplings (for example for transferring data), and that a further coupling/connector (e.g. a standard 12V connector for transferring power) may also be part of the connector. Where a connector comprises two couplings, the two couplings may be co-located, or located at different locations.

The second connector and/or the headwear connector may comprise a power connector for transferring power between the headset and the headwear. One of the connectors may comprise the male and the other connector may comprise the female connector. The second connector and/or the headwear connector may comprise electrical contacts. The second connector and/or headwear connector may comprise an inductive power transfer connector. The second connector and/or headwear connector may comprise a 12V power connector. However, the reader will appreciate that embodiments are not tied to this specification. For example, proposals exist for standardisation of equipment in a range from 8 to 36V, in one instance. It is desirable that the voltage be below 50V in the interests of safety.

The second connector and/or headwear connector may comprise any of DC or AC power plugs or sockets, USB connectors, RJ45 connectors, RJ12 connectors, RJ11 connectors, secure data connectors, Ethernet connectors, free-space optical connectors and fibre optic connectors. The second connector and/or headwear connectors may comprise wireless type connectors. The second connector and/or headwear connector may comprise optic fibre and/or optic fibre connectors. The second connector and/or headwear connector may comprise free-space optical connectors. For example, the second connector and/or headwear connector may utilise NFC, Bluetooth™, magnetic induction, short range Ultra Wide Band, WiFi or optical methods—for example free-space optical methods—to provide wireless communication with an external power or data system. As such, the second connector and/or headwear connector may comprise wireless connecters, suitable for use with the above-listed, and any other known wireless technology. The second connector and/or headwear connector may comprise a plurality of the different couplings (i.e. connectors) described above.

It is to be understood that the headset power or data system, and/or any headwear power or data system, may be compatible with the specific connector type—for example, if the second connector is an optical connector, the headset power or data system may be an optical system, or compatible with an optical system (for example by comprising optical transceivers); similarly, if the headwear connector is an optical connector (e.g. a free-space optical connector), any headwear power or data system may be an optical system or compatible with an optical system. The same applies to any other connector type.

Each of the second connector and headwear connector may comprise an optical connector (e.g. free-space optical connectors) to provide an optical power or data connection between the headset and headwear when connected.

The headset (and/or headwear) power and data system may be an optical system. The optical system may be for transferring data. The optical system may be a power over fibre system whereby the fibre optic system transfers power. The optical system may transfer power and data. Alternatively, the optical system may be for transferring data only, and an alternative power provision mechanism may be used alongside it. For example, the headset power and data system may comprise an optical system for the communication of data and a separate power system as part of the headset power and data system—for example a power storage unit. The optical system may use visible, or infrared light.

The headset and/or headwear power or data system may comprise a transceiver. The transceiver may be an electrical-optical transceiver. The second connector and/or the headwear connector may comprise a free-space optical connector, connected to an electrical-optical transceiver. Accordingly, the corresponding headset/headwear power or data system may be an electrical system, but the transceivers may allow power or data to be communicated optically.

The second connector and/or headwear connector may each further comprise a power connector (e.g. an electrical power connector) to provide a power connection (e.g. electrical power connection) between the headset and headwear when connected.

The headset and/or headwear connector may comprise a free-space optical connector and a power connector. The free-space optical connector(s) may be for transferring data. The power connector(s) may be for transferring power. The free-space optical connector(s) and power connector(s) may be arranged in parallel. Each power connector may comprise an electrical contact.

When the second connector and headwear connector comprise free-space optical connectors, a direct contact between the free-space optical connectors may not be required. As such, the second connector and headwear connector may be arranged such that, when the headwear is worn over the headset, the free-space optical connectors may be aligned but physically separated. In such an arrangement, the connectors may be configured to project a conical or dispersed beam of light, in order to correct for slight misalignment between the second connector and headset connector.

Alternatively, the optical second connector and optical headwear connector may abut.

Light spill may be a risk when the head utility system uses a light-based (e.g. optical) system. Light may be reflected or refracted or scattered away from the optical connectors and, in some cases, out of the head utility system. This will provide a visible signature which would allow a third party to identify the user. This may be undesirable in certain circumstances (e.g. for a soldier in the field).

The second connector and headwear connector may be arranged such that, when they are connected, they are not visible (e.g. from the outside of the headwear or from a third party's perspective). That is, the second connector and headwear connector may be arranged such that they are concealed when they are in a connected arrangement. The second connector and headwear connector may be arranged such that they are concealed by the headwear when they are in a connected arrangement and cannot be seen by a third party.

An arrangement in which the second connector and headwear connector are not visible when connected may prevent light spill when the second connector and headwear connector comprise optical connectors. This may reduce the likelihood that the connection provides an undesirable visible signature, alerting a third party to the user's presence.

The head utility system may comprise an internal optical connection between the headset and the headwear. That is, the optical connection (i.e. between the second connector and the headwear connector) may be internal, relative to the headwear. The connection may be located under the headwear. The second connector and headwear connector may be located on the headset and headwear respectively, such that they are sandwiched between the headset and the headwear when the headwear is worn over the headwear. The second connect and the headwear connector may be located inside the headwear when the user is wearing the headset and the headwear, such that the amount of light which can escape the headwear and provide a visible signature is minimised.

The headwear may be a helmet and the second connector and the headwear connector may be arranged such that, when the second connector and headwear connector are connected, they are located on the inside of the helmet and are thus not visible. The second connector may be arranged at the top of the headset (e.g. at a location on the support frame such that it is located on top of a user's head when the headset is worn). The headwear connector may be arranged on the inside of the helmet such that the headwear connector is connectable with the second connector when the headwear is worn and light spill is minimised.

The head utility system may comprise a surround arranged to reduce light spill from the second connector or the headwear connector.

The surround may be arranged to reduce light spill from the second connector and the headwear connector when the second connector and headwear connector are being connected or disconnected.

The surround may be included to reduce light spill. This may be achieved by the light spill acting as a barrier which prevents light from escaping from at least one of the second connector, headwear connector, headset, headwear or head utility system.

The surround may be a feature arranged to block a portion of the light which would otherwise travel from the second connector or the headwear connector to the outside of the head utility system.

The surround may be arranged to partially or entirely surround the headwear connector and/or the second connector. The surround may comprise a circumferential protrusion in the form of a collar. The surround may comprise a piece of material which can be arranged around, or adjacent the second connector or headwear connector.

The surround may be part of, or located on, the headset or headwear. When the headwear is a helmet or hat, the surround may be located on the inside of the headwear, at least partially surrounding the headwear connector. The headwear and/or headset (or a part thereof) may form the surround. The surround may be located on, or integral with, the second connector or the headwear connector. The surround may be part of the support frame or the headwear.

It is to be understood that the use of the term light when referring to an optical system can, in certain circumstances, be replaced with any electromagnetic wave.

A surround may also be arranged to reduce light spill from the first connector and the discussion relating to a surround for the second connector or headset connector applies, mutatis mutandis to that of the first connector.

The surround may also be the guide. As such, the surround may also be arranged to help locate the headwear connector relative to the second connector such that they connect when a user puts the headwear on over the headset. Accordingly, in this case the discussion relating to features of the guide may also apply to the support, mutatis mutandis.

When the second connector and headwear connector are optical connectors (e.g. free-space optical connectors), there may be light spill—and hence a visible signature—when the user removes the headwear from the headset. The head utility system (or second connector and headwear connector) may therefore be configured such that the transmission of power or data across the 'second connector-headwear connector' connection is stopped before the headwear is removed from the headset. This may be achieved by disconnecting the supply of power or data to the second connector and/or headwear connector.

The head utility system may comprise a switch to allow a user to turn off the power or data before removing the headwear. Such a switch may be located on the headset or the headwear.

The head utility system may comprise a proximity switch. The proximity switch may be configured to disconnect the supply of power or data to the second connector and/or headwear connector. The proximity switch may be configured to disconnect the supply of power or data when the second connector and headwear connecter are separated by more than a predetermined distance.

The proximity switch may be configured to turn off the second connector and/or the headwear connector. The proximity switch may be configured to control the supply of power or data to the second connector and/or the headwear connector.

The proximity switch may be configured to supply power or data to the second connector and/or headwear connector when the second connector and the headwear connector are within the predetermined distance of each other.

The predetermined distance may be the nominal range of the proximity switch (i.e. the maximum distance that a proximity switch can detect). The predetermined distance may be a distance which is determined by a user as being the maximum distance at which the light spill is still within an acceptable limit. The headset and/or headwear power or data system may comprise a proximity switch. The proximity switch may be connected to a power supply. The proximity switch may be connected to a processor and data storage unit on the head utility system and/or a processor and data storage unit on a torso-mounted power or data system. The predetermined distance may be selected and stored on the data storage unit.

The proximity switch may be implemented to reduce undesirable light spill. Additionally or alternatively, the proximity switch may be implemented to reduce the likelihood of unintentional short circuits being caused at any exposed contact surfaces of the second connector or headwear connector.

The predetermined distance may be measured between the headset and the headwear, or the second connector and the headwear connector. The predetermined distance may instead be measured between a user's head and the headwear or two proximity sensors forming part of the proximity switch.

The predetermined distance may be less than 100 mm, 80 mm, 60 mm, 50 mm, 40 mm, 30 mm, 20 mm or 10 mm.

The proximity switch may be part of the headset and/or headwear. The proximity switch may be part of the second connector and/or headwear connector. The head utility system may comprise a plurality of proximity switches—e.g. one for each of the headset and headwear, or one for each connector. The proximity switch may comprise two proximity sensors—one on each of the headwear and headset (or second connector and headwear connector). The proximity sensors may be arranged to sense when they are close to each other, in order to control power or data transmission/supply through/to the second and/or headwear connector.

The proximity switch may be a mechanical proximity switch, relying on physical contact to supply/disconnect the power or data supply, or a wireless proximity switch. The proximity switch may comprise a proximity sensor. The proximity switch may operate based on capacitance, the Doppler Effect, eddy-current, inductance, magnets or optical methods (e.g. photocells, laser rangefinders, passive thermal infrared). The proximity switch may comprise a proximity sensor and circuitry, which provides control to the second connector and/or headwear connector.

The proximity switch may comprise two magnetic sensors, one on the headwear and one on the headset, each of which is fitted to a trip switch. As such, when the two magnetic sensors are separated and cannot detect each other, the switch would be open and no power/data would be supplied to the second connector or headset connector (i.e. one or both of the second and headwear connectors would be turned off).

The head utility system may further comprise a torso power or data system. The first connector may be arranged to connect to the torso power or data system. The first connector may be connected to the torso power or data system. The torso power or data system may comprise a power supply and/or data storage unit. The power supply and/or data storage unit may service the headset power or data system and any power or data system on the headwear (or the power or data needs of any electronic modules or ports on the headwear).

A torso power or data system may be according to that disclosed in UK Patent GB2530064.

The head utility system may comprise a second item of headwear. The second headwear may comprise corresponding features to the headwear. The first headwear may be a helmet and the second headwear may be a set of glasses or goggles. The discussion of features relating to the first headwear apply to the second headwear, mutatis mutandis. The headset may comprise a third connector—equivalent to the second connector—for connecting to a connector on the second headwear in an analogous way to the second headset connector and headwear connector. The second item of headwear may comprise a power or data connector arranged to be connected to a further connector on the first item of headwear.

Further according to an embodiment of the present disclosure is a headset as described anywhere herein. As such, any discussion above relating to features of a headset forming part of a head utility system applies, mutatis mutandis, to a headset as a separate embodiment of the present disclosure.

According to an embodiment is a headset comprising:
    a first power or data connector for connecting to an off-headset power or data system; and
    a second power or data connector, the second connector being arranged to releasably connect to a headwear connector in an item of headwear worn over the headset.

The headset may comprise a support frame for locating the headset on a wearer's head.

The headset may comprise a power or data system. The power or data system may comprise the first and second connectors.

The headset may be an audio headset and may comprise at least one of a speaker and a microphone.

The first and/or second connector may comprise an optical connector, for example a free-space optical connector.

The second connector may be arranged on the headset such that the second connector is located at the top of a user's head when the headset is worn—as discussed above in relation to the head utility system. The support frame may comprise a strap to pass over the top of the user's head. The second connector may be located on this strap.

The headset may further comprise a surround arranged to reduce light spill from the second connector. The surround may be arranged on the support frame or the second connector. The surround may be arranged to reduce light spill when the second connector is not connected to a further connector.

The headset may further comprise a proximity switch configured to deactivate the second connector when nothing is sensed within the nominal range of the proximity switch. To deactivate the second connector the proximity switch may disconnect the supply of power or data to the second connector. The proximity switch may turn the second connector off. The proximity switch may be located on the support frame or as part of the second connector.

Further according to an embodiment of the present disclosure is headwear as described anywhere herein. As such, any discussion above relating to features of headwear forming part of a head utility system applies, mutatis mutandis, to a headset as a separate embodiment of the present disclosure.

According to an embodiment is headwear for wearing over a headset, the headwear comprising:
    a headwear power or data connector arranged to releasably connect to a headset connector on a headset worn under the headwear.

The headwear may be a helmet and the headwear connector may be located inside the helmet. The headwear connector may be located at the top of the helmet.

The headwear connector may comprise an optical connector, e.g. a free-space optical connector.

The headwear may comprise a surround arranged to reduce light spill from the headwear connector. The surround may be arranged on the headwear or the headwear connector. The surround may be arranged to reduce light spill when the headwear connector is not connected to a further connector.

The headwear may further comprise a proximity switch configured to deactivate the headwear connector when nothing is sensed within the nominal range of the proximity switch. To deactivate the headwear connector the proximity switch may disconnect the supply of power or data to the headwear connector. The proximity switch may turn the headwear connector off. The proximity switch may be located on, or as part of, the headwear connector.

These and other features of the present invention will now be described in further detail with reference to the accompanying drawings.

DESCRIPTION OF DRAWINGS

FIG. 1 shows a head power or data system according to the prior art. A user wears a torso-based power or data system 10 which is connected, or connectable to a headwear 14 (e.g. helmet) based power or data system 12. Under the headwear, a user wears a headset 16 (e.g. an audio headset). The headset 16 of the embodiment of FIG. 1 is electronically and mechanically separate from the headwear 14 and associated power or data system 12.

Figure 1:
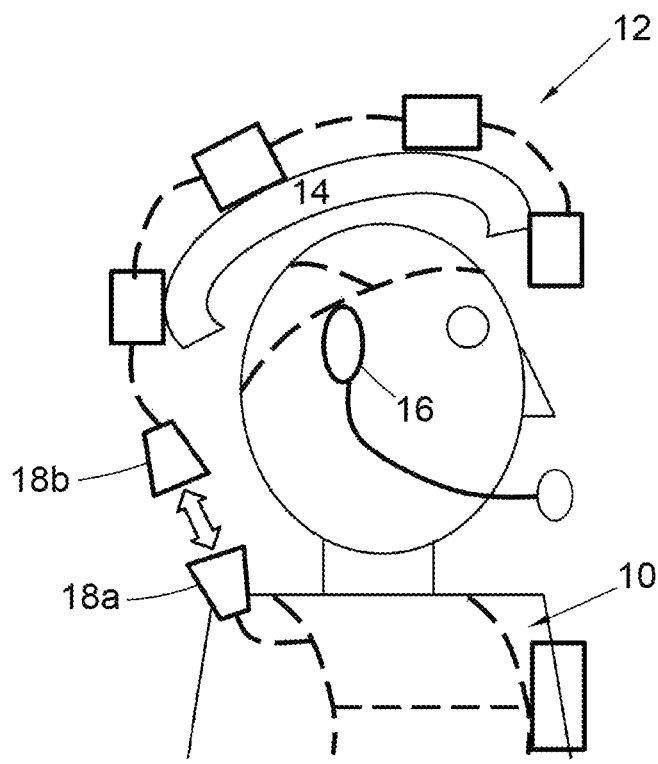
FIG. 1 is a schematic representation of a head power and data system according to the prior art.

In the embodiment of FIG. 1, connectors 18a 18b connected to the torso and headwear based power or data systems, respectively, are located towards the rear of a user's head. The connection may be physical (i.e. the connectors 18a 18b are in contact), or wireless. If the connection is physical, and the two connectors 18a 18b are mechanically attached to each other, it is likely that the connection and associated cables will catch on other items of clothing or the surroundings (e.g. branches). It is also likely that the user will have difficulty removing the headwear 14 while it is connected to the torso power or data system 10 and so the user will either need to struggle to remove the headwear, or will need to disconnect the headwear 14 from the torso power or data system 10 first. Either method will result in addition hassle and delay associated with removing the headwear 14.

Due to the location of the connectors, it is likely that the connection must be able to handle a large degree of misalignment—since the connection 18b attached to the headwear is going to move relative to the torso-mounted connection 18a as the user moves their head. Very short range wireless connections (e.g. NFC) and wireless connections requiring precise alignment (e.g. narrow beam optical systems) are likely to be unreliable and provide a poor connection during use. However, if the connection between the two connectors 18a 18b is a wireless connection with a larger range, it is likely that either a signature of this wireless connection will be detectable by a third party from a distance. This is undesirable, especially when the system is used by a solder in a conflict zone. The signature can be used to alert the third party to the user's presence, or can be used to automate an aggressive action, such as triggering an improvised explosive device. Furthermore, if the connection is an optical system, it is likely that an optical signature would be detectable either during use or when a user needs to remove the headwear during an operation.

Figure 2:
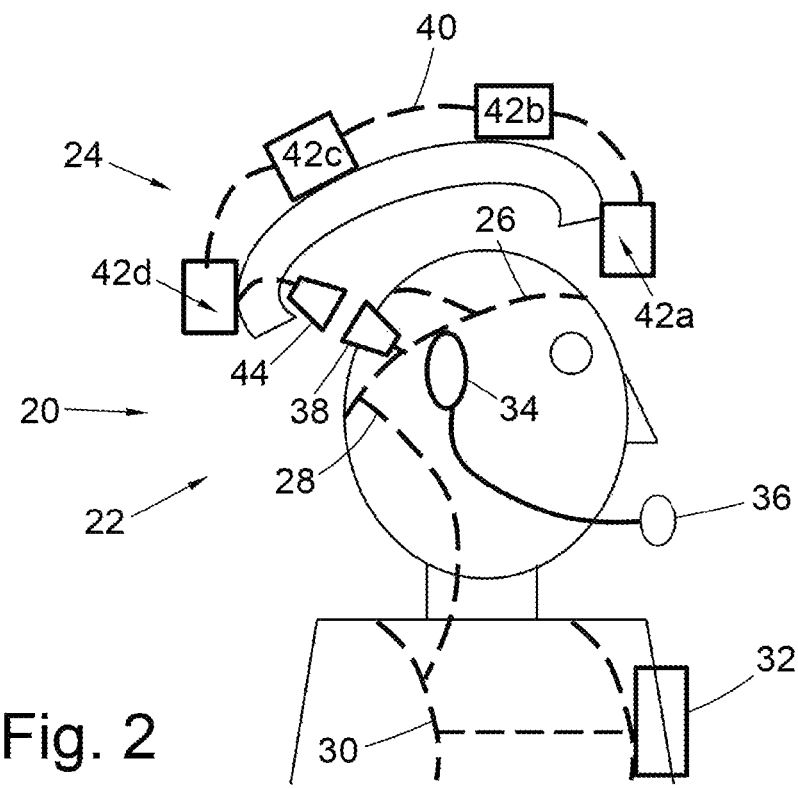
FIG. 2 is a schematic representation of a head utility system according to the present application.

FIG. 2 illustrates an embodiment according to the present disclosure. In FIG. 2, a head utility system 20 is shown.

The head utility system 20 comprises a headset 22 and headwear 24. The headset 22 comprises a support frame (not shown) and a headset power or data system 26. The headset power or data system 26 of the present embodiment comprises a cable for extending around a user's head and a strap for extending across the top of a user's head. The headset power or data system 26 comprises a first power or data connector 28. In the present embodiment, the first connector 28 is not releasable, but in other embodiments, it may be releasable. The first connector 28 of the embodiment of FIG. 2 is in the form of a power or data cable and is directly connected to a torso-worn power or data system 30. The torso power or data system 30 may comprise a module 32 which may be a data storage unit or power supply and thus power or data may be communicated to/from the headset power or data system 26 from the torso power or data system 30 via the first connector 28. The torso power or data system 30 may also comprise a radio.

In the embodiment of FIG. 2, the headset 22 is an audio headset and comprises an earpiece 34 and a microphone 36 for listening to and communicating with a third party.

The headset 22 also comprises a second power or data connector 38. The second power or data connector 38 is a releasable power or data connector 38 and so can be connected and disconnected by a user. The second connector may comprise a mechanical and electrical connector, or a wireless connector.

The headwear 24 is configured (e.g. sized and shaped) to be worn over the top of the headset 22. The headwear 24 of the embodiment of FIG. 2 comprises a headwear power or data system 40. The headwear power or data system 40 comprises a plurality of electronic modules 42. The headwear electronic modules 42 of FIG. 2 comprises a head mounted display (HMD) 42a, a camera 42b, a GPS device 42c and an environmental sensor 42d which may monitor temperature, humidity or monitor for the presence of any airborne particles. These specific electronic modules 42 are for illustrative purposes only. In other embodiments, one or more than one of the electronic modules 42 may be a power storage unit, e.g. a battery.

The headwear 24 also comprises a headwear power or data connector 44. The headwear power or data connector 44 is a releasable power or data connector 44 and so can be connected and disconnected by a user. The headwear connector 44 is arranged such that it can connect to and disconnect from (either physically—i.e. a "wired" connection—or wirelessly) the second connector 38 on the headset 22. The second connector 38 and the headwear connector 44 may connect automatically when a user puts the headwear 24 on over the headset 22. Alternatively, a user may manually connect and disconnect the second connector 38 and headwear connector 44 when putting on and taking off the headwear 24.

In the embodiment of FIG. 2, the second connector 38 and headwear connector 44 are located towards the rear of a user's head. The headwear connector 44 is located on the inside of the headwear 24 and the second connector 38 is arranged to be located in the vicinity of the headwear connector 44 when the headwear 24 is worn over the headset 22.

Since the second connector 38 and headwear connector 44 are arranged on the headset 22 and headwear 24 respectively, and the headwear 24 is worn over the headset 22 when a connection is required, a number of advantages are provided. First, it is easy to arrange the second connector 38 and headwear connector 44 such that, when the headwear 24 is worn over the headset 22, the two connectors are located very close to each other, or even in contact with each other. This facilitates easy and robust connection. As the headset 22 and headwear 24 are both worn on a user's head, there will not be any relative movement between these two items. As such, a short range wireless communication is unlikely to suffer from a lack of alignment, and the connection quality of such connection methods is greatly improved. Furthermore, it is possible to reduce or eliminate optical signatures when using an optical connection, since the connection may be located within the headwear and thus any light which escapes from the connection may be shielded by the headwear.

Figure 3A:
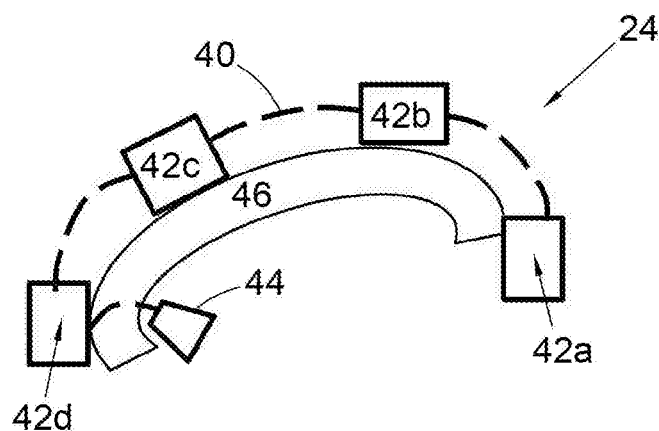
FIGS. 3A and 3B are schematic representations of a headset according to the present application and headwear according to the present application, respectively.

FIG. 3A illustrates the headwear 24 of the embodiment of FIG. 2. The headwear 24 of FIG. 3A is a helmet and so comprises a protective helmet shell 46. The headwear power or data system 40 in the embodiment of FIG. 3A is arranged on the outside of the protective shell 46; however, in alternative arrangements the power or data system 40—or a part thereof—may be arranged on the inside of the protective shell 46, or integral with the protective shell 46.

In FIG. 3A, the headwear 24 is not being worn by the user. The headwear connector 44 is not connected to the second connector 38. The headwear connector 44 may automatically disconnect as the headwear is removed from the user's head, meaning that a distinct step of disconnecting the headwear connector 44 and second connector 38 is not required.

Figure 3B:
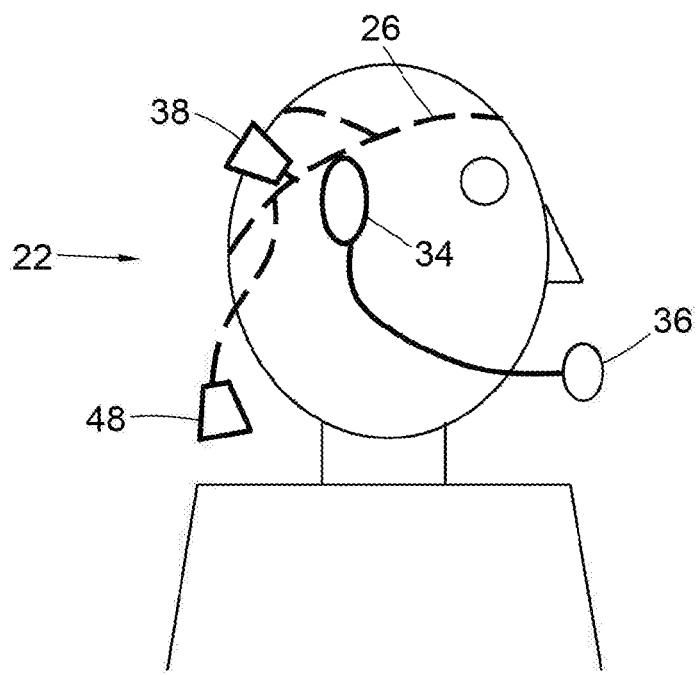

Turning now to FIG. 3B, a headset 22 is shown on the head of a user. The headset 22 of FIG. 3B comprises a headset power or data system 26 and a support frame (not shown). The headset 22 is an audio headset and comprises an earpiece 34 and a microphone 36 for listening to and communicating with a third party. The headset power or data system comprises a first connector 48. In this embodiment, the first connector is a releasable power or data connector 48. The first connector is arranged and configured to be connectable to an off-head power or data system (not shown), for example a torso based power or data system or a stand-alone power supply or data storage unit. In the embodiment shown, the first connector comprises a cable extending from the headset power or data system 26. The first connector 48 can be connected and disconnected to the off-head power or data system. The first connector 48 of any embodiment may be the same as the second connector 38.

During use, a user may put the headset 22 on their head and fasten any attachment straps. The headset 22 can then be connected to a torso power or data system by means of the first connector 48. The user can then put the headwear 24 on over the top of the headset 22. As the headwear 24 is put on over the headset 22, the headset second connector 38 automatically provides a power or data connection with the headwear connector 44. As such, once the headwear 24 is in place over the headset 22, power or data is provided from the torso power or data system, via the headset 22, to the headwear 24. The electronic modules 42 can then be used by the wearer without: cables running between the headwear and the torso posing a catch hazard; a poor connection quality due to frequent misalignment of wireless connectors between the headwear and the torso; and a detectable signature being provided due to the use of a large-range wireless connection or exposed optical system.

Once the headwear 24 is no longer required, the user can simply remove the headwear 24 from the headset 22. The second connector 38 and headwear connector 44 are arranged to automatically disconnect as the headwear 24 is removed from the headset 22 and so no further steps are required in order to disconnect the headwear 24 from the headset 22. The headset 22 can then be disconnected from the torso power or data system and removed, or kept on. Since the headset 22 is a much smaller, lighter weight device, it is likely that a user will be more inclined to keep it on, compared to the headwear 24. This is especially the case where the headset itself provides some functionality, such as supporting the audio elements (for example audio headphones and a microphone) needed to maintain radio communications.

Figure 4:
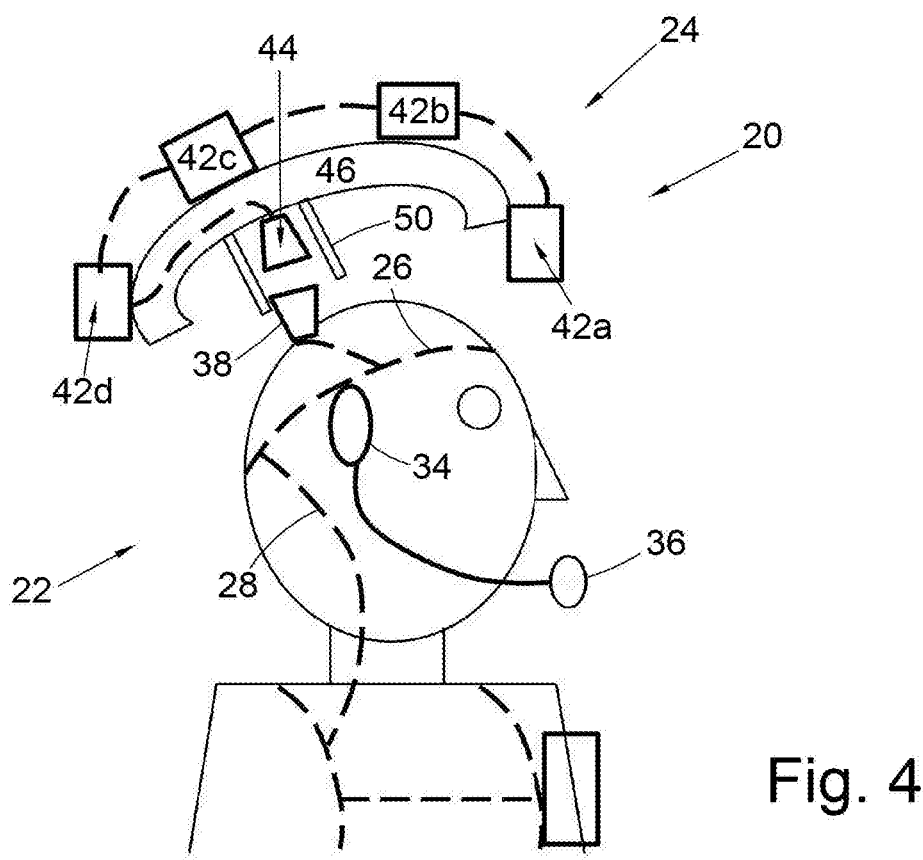
FIG. 4 is a schematic representation of a head utility system according to the present application.

FIG. 4 illustrates a further embodiment of the head utility system. Components in common with the embodiment of FIG. 2 are denoted with the same reference numeral and will not be discussed further here, only the differences between the embodiments of FIG. 2 and FIG. 4 will be discussed.

In the embodiment of FIG. 4, the headset second connector 38 is arranged on the strap of the power or data system 26 which extends over the top of a user's head when worn. As such, the second connector 38 is arranged such that it is located at the top of a user's head, over the parietal region of a user's head when the headset is worn. The headwear connector 44 is arranged on the inside of the headwear 24 at a corresponding location, such that the second connector 38 and headwear connector 44 may align and connect when the headwear 24 is put on over the headset 22.

In the embodiment of FIG. 4, the second connector 38 and the headwear connector 44 comprise an optical connector (e.g. a free-space optical connector), for communicating power or data between the headset 22 and the headwear 24.

The head utility system 20 of FIG. 4 further comprises a surround 50. The surround 50 is arranged on the inside of the headwear 24 in the form of a cylindrical collar, surrounding the headwear connector 44. The surround 50 is arranged such that it surrounds the connection between the headwear connector 44 and the second connector 38. Accordingly, when the second connector 38 and headwear connector 44 are connecting and disconnecting, the surround 50 reduces light spill. That is the, the surround 50 reduces the amount of light—escaping from the second connector 38 and/or headwear connector 44 during connecting or disconnecting—emitted from the head utility system 20, and thus reduces the likelihood that a third party will be notified to the wearer's presence.

In alternative embodiments, the surround may be arranged on the headset 22, rather than the headwear 24.

Figure 5:
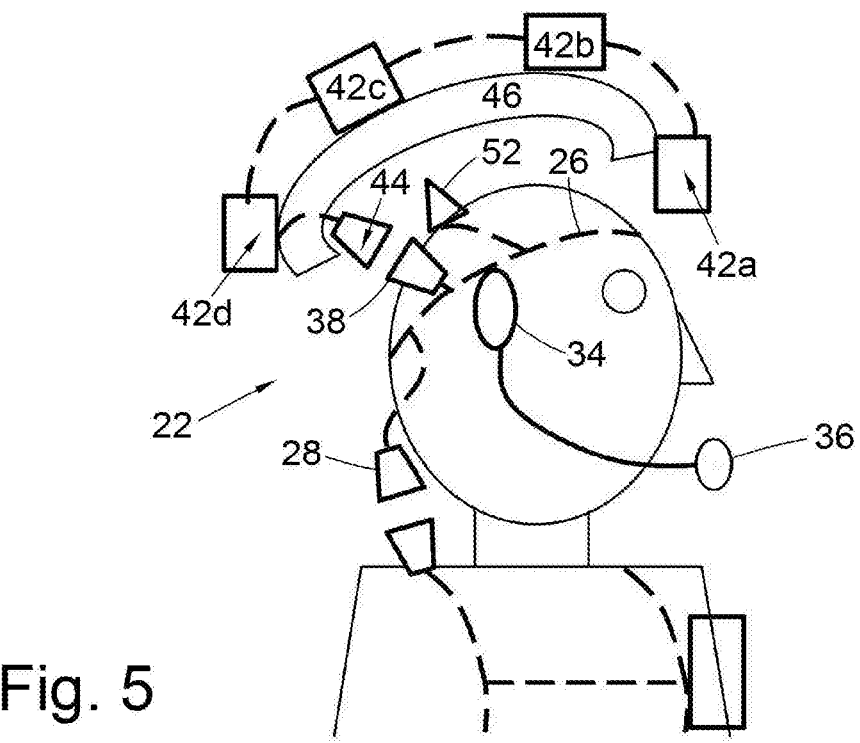
FIG. 5 is a schematic representation of a head utility system according to the present application.

Turning now to FIG. 5, a further embodiment of the head utility system is illustrated. The headset 22 and headwear 24 depicted in FIG. 5 are similar to those shown in FIGS. 3A and 3B. Components in common with the embodiments of FIGS. 3A and 3B are denoted with the same reference numeral and will not be discussed further here, only the differences will be discussed.

In the embodiment of FIG. 5, the second connector 38 and the headwear connector 44 comprise an optical connector (e.g. a free-space optical connector), for communicating power or data between the headset 22 and the headwear 24.

The head utility system further comprises a proximity switch 52. The proximity switch 52 is configured to disconnect the supply of power or data to the second connector 38 (or headwear connector 44) when the second connector 38 and headwear connecter 44 are separated by more than a predetermined distance.

In FIG. 5 the proximity switch is connected to the headset, but in other embodiments it may be connected to the headwear, or both the headset and the headwear.

The proximity switch 52 is configured to prevent light spill when the second connector 38 and headwear connector 44 are not connected. Accordingly, the proximity switch 52 may be configured such that one, or both, of the second connector 38 and headwear connector 44 are only activated (and hence are only transmitting power or data optically) when the headset 22 and headwear 24 (or second connector 38 and headwear connector 44) are within a specific distance of each other. The specific (predetermined) distance may be chosen such that light is unable to escape from between the headset 22 and headwear 24 at this distance, or the amount of light spill is at an acceptable level. The predetermined distance may be the activation range of the proximity switch 52.

During use, a user may connect the headset 22 to a torso power or data system by means of the releasable second connector 28. When a user is not wearing the headwear 24, the proximity switch 52 will not detect the present of the headwear 24 and so no power or data will be provided to the second connector 38 (i.e. the second connector 38 is turned off). As the user puts the headwear 24 on over the headset 22, the proximity switch 52 detects the presence of the headwear 24 and connects the second connector 38 (i.e.

turns the second connector on) so that an optical connection is provided between the second connector 38 and the headwear connector 44 and thus the headwear 24 and the torso power or data system, via the headset 22.

The proximity switch 52 may be arranged on the headwear 24 and may control activation of the headwear connector 44, rather than the second connector 38. The proximity switch 52 may be arranged on both the headset and headwear. The proximity switch 52 may be arranged to ensure that neither of the headset and headwear can emit unless they are within an acceptable proximity.

The proximity switch 52 of FIG. 5 can be used in combination with the surround 50 of FIG. 4.

Figure 6:
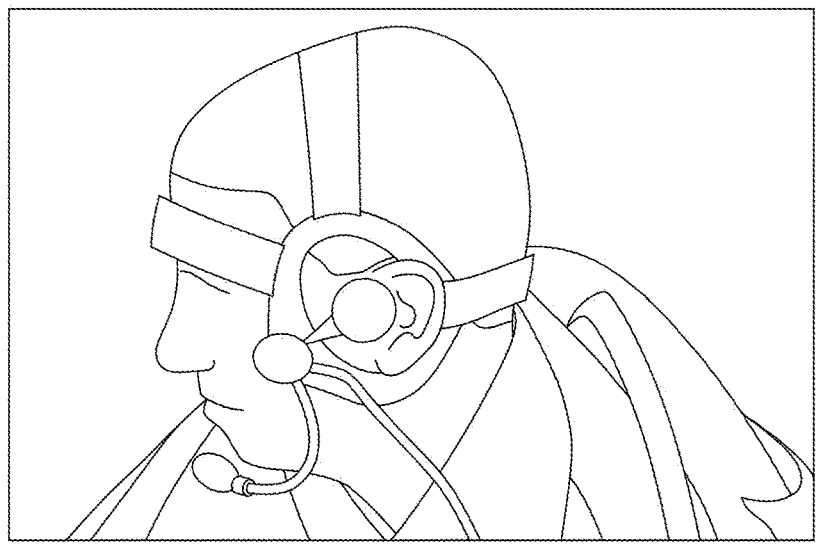
FIG. 6 is side view of an audio headset suitable for use with an embodiment of the present application.

FIG. 6 illustrates a user wearing a headset. The headset may be suitable for use with embodiments of the present disclosure.

Figure 7:
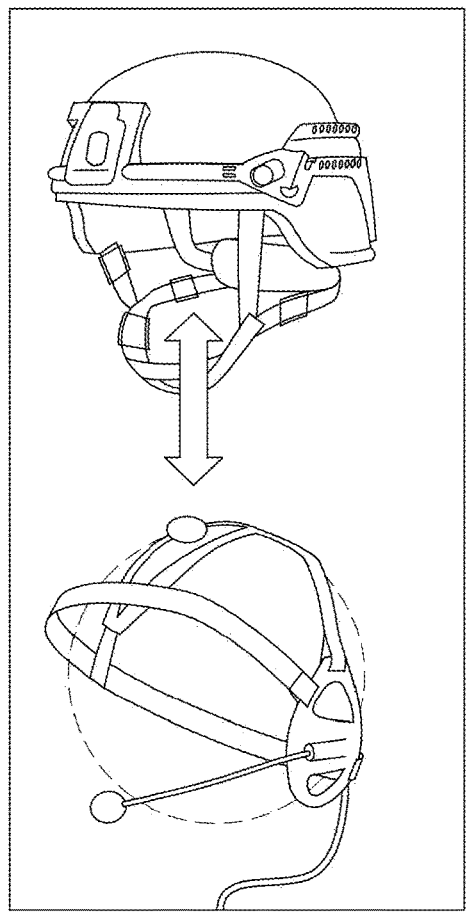
FIG. 7 is a perspective view of a head utility system according to the present application.

FIG. 7 illustrates a possible embodiment of the present disclosure. The head utility system of FIG. 7 comprises headwear in the form of a helmet, which can be put on top of an audio headset. A cylindrical connector can be seen on a strap of the headset arranged to extend from the front of the user's head to the rear of the user's head, across the top of the head.

Figure 8:
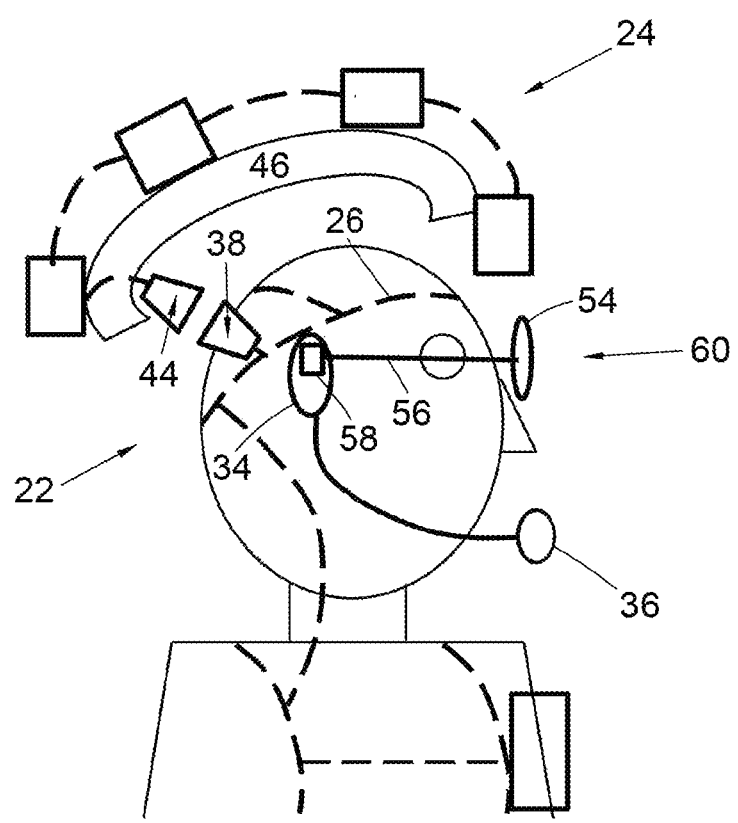
FIG. 8 is a schematic representation of a head utility system according to the present application.

FIG. 8 illustrates a head utility system comprising a headset 22 and a first headwear 24. The features of the headset 22 and the first headwear 24 are the same as those of FIG. 2. These features will not be discussed here.

The head utility system of FIG. 8 further comprises a second headwear 60. The second headwear 60 is a pair of glasses. The second headwear comprises a second headwear connector 58, which is arranged to connect to a third connector (not shown) on the headset 22. The third connector on the headset is equivalent to the second connector and allows the second headwear to connect to the headset power or data system. The second headwear comprises a frame 56 which supports a head mounted display 54.

Figure 9:
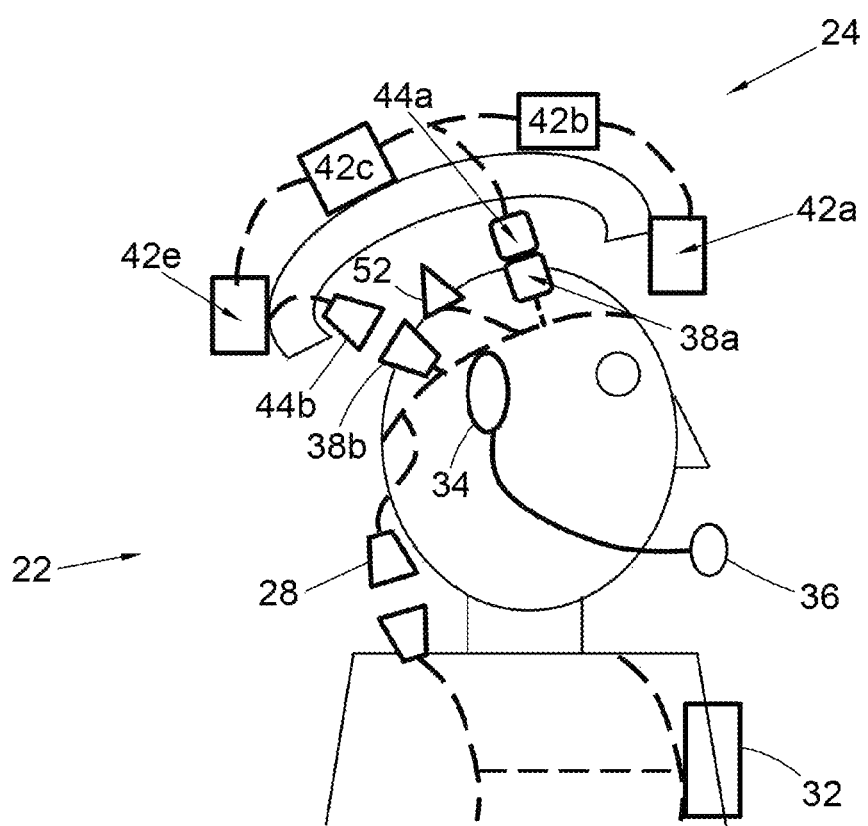
FIG. 9 is a schematic representation of a head utility system according to the present application.

FIG. 9 illustrates a head utility system comprising a headset 22 and headwear 24. No discussion will be provided on features which are identical to those used in earlier-described embodiments. In this case, the same reference numerals will be used as previously.

In the embodiment of FIG. 9, the second connector 38 comprises two coupling components 38*a*, 38*b*. The second connector 38 comprises a power connector 38*a* and a data connector 38*b*.

The headwear connector 44 also comprises two coupling components 44*a*, 44*b*. The headwear connector 44 comprises a power connector 44*a* and a data connector 44*b*. The headwear power connector 44*a* and headwear data connector 44*b* are arranged to be releasably coupled to the second power connector 38*a* and second data connector 38*b* respectively when the headwear is worn over the headset, such that power or data can be transferred between the headset 22 and the headwear 24.

The power connectors 38*a*, 44*a* and data connectors 38*b*, 44*b* are arranged in parallel on the headset 22 and headwear 24, such that the two power connectors 38*a*, 44*a* and data connectors 38*b*, 44*b* can connect simultaneously as the headwear 24 is put on over the headset 22.

The power connectors 38*a*, 44*a* of the second and headwear connectors of the present embodiment each comprise an electrical contact, exposed so that they can connect when the headwear 24 is worn over the headset 22. Each of the electrical contacts may be arranged such that it can contact the other electrical contact when the headwear 24 is worn over the headset 22, but cannot be accidentally contacted by a user when the headwear 24 is not worn over the headset 22.

In other embodiments, the power connectors 38*a*, 44*a* may comprise inductive power connectors, such that the second connector 38 induces an electrical current in the headwear connector 44.

The data connectors 38*b*, 44*b* of the second and headwear connectors of the present embodiment are both free-space optical connectors. The free-space optical connectors are arranged such that they can connect (i.e. be arranged so that communication can take place between the two free-space optical connectors) when the headwear 24 is worn over the headset 22.

The data connectors 38*b*, 44*b* may be connected to the headwear power or data system (or the headset power or data system) by means of an optical-electrical transceiver, to which each of the data connectors 38*b*, 44*b* may be connected.

The headset 22 comprises a proximity switch 52 which is configured to prevent light spill when the second connector 38 and headwear connector 44 are separated by more than a defined distance, as described above. This is achieved by the proximity switch 52 being configured to deactivate communication between the two free-space optical connectors when the two connectors are disconnected. The proximity switch 52 may comprise a component on headset 22 and headwear 24 (not shown) to achieve this.

The proximity switch is also configured to disconnect power from being supplied to one of, or both of, the electrical contacts when the headset 22 and headwear 24 are separated by a predetermined amount (e.g. when the electrical contacts are disconnected). This may prevent an inadvertent short circuit occurring when the headwear 24 is removed from the headset 22.

One of the electronic modules 42 of the headwear 24 in the embodiment of FIG. 9 is a battery pack 42*e*. The battery pack 42*e* is connected to the headwear power or data system such that it can provide power to the other electronic modules 42. The battery pack 42*e* may be configured to operate the electronic modules when the second connector 38 and headwear connector 44 are disconnected. The battery pack 42*e* may be charged up when the second connector 38 and headwear connector 44 are connected.

An embodiment in accordance with FIG. 9 may also comprise a surround 50 as described with relation to FIG. 4.

While certain embodiments have been described, these embodiments have been presented by way of example only and are not intended to limit the scope of the invention. Indeed, the novel devices and systems described herein may be embodied in a variety of forms; furthermore, various omissions, substitutions and changes in the form of the devices and systems described herein may be made. The accompanying claims and their equivalents are intended to cover such forms or modifications as would fall within the scope of the invention defined by the claims.

The invention claimed is:

1. A head utility system comprising:
    a headset comprising:
        a first power or data connector for connecting to an off-headset power or data system; and
        a second power or data connector;
    the head utility system further comprising:
        headwear for wearing over the headset, the headwear comprising:
            a headwear power or data connector for connecting to the second power or data connector;
    wherein the second power or data connector and the headwear power or data connector are arranged to be releasably connectable when the headwear is worn over the headset, such that power or data can be transferred between the headset and the headwear.

2. A head utility system according to claim 1, wherein the headset comprises a headset power or data system and the headset comprises an electronic module connected to the headset power or data system.

3. A head utility system according to claim 1, wherein the headwear is a helmet and the headset is an audio headset and comprises at least one of an earpiece and a microphone.

4. A head utility system according to claim 1, wherein the headwear further comprises a headwear power or data system and the headwear power or data system comprises a port for providing power or data to an electronic module.

5. A head utility system according to claim 1, wherein the second connector and the headwear connector are arranged such that they automatically connect when a user puts the headwear on over the headset, and automatically disconnect when the user removes the headwear.

6. A head utility system according to claim 1, wherein each of the second connector and headwear connector comprise an optical connector to provide an optical data connection between the headset and headwear when connected.

7. A head utility system according to claim 6, wherein the second connector and headwear connector each further comprise an electrical power connector to provide an electrical power connection between the headset and headwear when connected.

8. A head utility system according to claim 6, wherein the head utility system comprises a surround arranged to reduce light spill from the second connector or the headwear connector.

9. A head utility system according to claim 1, further comprising a proximity switch configured to disconnect the supply of power or data to the second connector or headwear connector or both the second connector and headwear connector when the second connector and headwear connecter are separated by more than a predetermined distance.

10. A headset comprising:
a first power or data connector for connecting to an off-headset power or data system; and
a second power or data connector, the second power or data connector being arranged to releasably connect to a headwear power or data connector in an item of headwear worn over the headset.

11. A headset according to claim 10, wherein the headset is an audio headset and comprises at least one of a speaker and a microphone.

12. A headset according to claim 10, wherein the second connector is an optical connector.

13. A headset according to claim 12, further comprising a surround arranged to reduce light spill from the second connector.

14. A headset according to claim 10, further comprising a proximity switch configured to deactivate the second connector when nothing is sensed within the nominal range of the proximity switch.

* * * * *